Patented Jan. 19, 1932

1,842,010

UNITED STATES PATENT OFFICE

KARL BRAUS, OF OPPAU, GERMANY, ASSIGNOR TO I. G. FARBENINDUSTRIE AKTIENGESELLSCHAFT, OF FRANKFORT-ON-THE-MAIN, GERMANY

REMOVAL OF ACETYLENE HYDROCARBONS FROM GASES

No Drawing. Application filed December 16, 1930, Serial No. 502,862, and in Germany December 23, 1929.

The present invention relates to the removal of acetylene hydrocarbons from gases containing hydrogen and which may be from any source, especially those issuing from industrial processes such as coke oven gases, brown coal gases and the like.

It has already been proposed to free industrial gases such as coke oven gases, brown coal gases and the like, from the acetylene hydrocarbons contained therein by passing them at elevated temperatures over catalysts containing aluminium oxide, iron or nickel. Of these catalysts, aluminium oxide and iron have the drawback that in order to obtain a complete purification temperatures above 300° C. must be maintained whereby other components of these gases, as for example olefines, may be readily catalytically decomposed or converted. Catalysts containing nickel, though they allow of the employment of lower temperatures, are to a large extent sensitive to sulphur so that in order to maintain the activity of the catalysts it is necessary previously to purify the gases completely from inorganic and organic sulphur compounds and this can only be effected with great trouble.

I have now found that gases from any source containing hydrogen, or which are mixed with hydrogen, and which may also contain inorganic and organic sulphur compounds may be freed completely from acetylene and homologues thereof contained therein as an impurity even at temperatures of 200° C. by passing the gases over catalysts consisting of or containing molybdenum or tungsten or both. The acetylene, for example, is thereby partly converted into ethane and partly polymerized. The molybdenum or tungsten may be employed either in the free state or in the form of oxides, sulphides or other compounds such as molybdic or tungstic acid. The said metals or compounds thereof may be used alone or in admixture with each other or with other metal oxides, and in particular difficulty reducible oxides, or metal compounds or non-metals. As examples of the said admixtures may be mentioned iron, nickel, cobalt, manganese, bismuth, vanadium or uranium as metals or in the form of their oxides. For example molybdenum or tungsten compounds may be used in admixture or in combination with aluminium oxide, zinc oxide or chromium oxide. The catalysts may also be precipitated on carriers such as fireclay, pumice stone, kaolin, active carbon, silica gel, fuller's earth, Florida earth, magnesia, clay or diatomaceous earth and the like in the manner already known. Molybdenum and tungsten are not sensitive to sulphur and do not cause any decomposition of other valuable hydrocarbons contained in the treated gases even at temperatures up to 600° C. These properties are retained even if molybdenum is mixed with other metals or compounds thereof, as for example nickel, iron, aluminium oxide or fuller's earth.

As homologues of acetylene may be mentioned methylacetylene, dimethylacetylene, ethylacetylene, diacetylene.

The process according to the present invention may be carried out at atmospheric, reduced or increased pressure, and the initial gases may be previously purified or not. Pressures ranging between atmospheric and 200 atmospheres have proved particularly advantageous in practice.

As examples of the gases from which acetylene may be removed in accordance with the present invention may be mentioned coke oven gas, illuminating gas, low temperature carbonization gas, cracking gases, oil gas, waste gases from destructive hydrogenations or gases obtained by the thermal electric or electro-thermal treatment of hydrocarbons, for example of methane, if desired, after the main portion of acetylene has been recovered from the said gases by other means.

At least two volumes of hydrogen for each volume of acetylene must be present in the gas mixtures, but in the case of gases very poor in acetylene, the proportion must be considerably higher. An excess of hydrogen is advantageous.

The process is usually carried out at temperatures ranging between 200° and 600° C. although higher or lower temperatures may be used.

The following examples will further illustrate the nature of this invention, but the invention is not restricted to these examples. The parts are by weight unless otherwise specified.

Example 1

A coke oven gas freed in the usual manner from tar and ammonia but still containing benzene and sulphur is passed at 250° C. with a velocity of 200 cubic metres of gas per hour over 100 litres (shaking volume) of a catalyst which has been prepared by mixing together equal amounts of molybdic acid and chromic anhydride, and drying, heating and reducing the mixture at from 400° to 500° C. The content of acetylene in the gas, which before entry into the catalyst chamber is 0.1 per cent, has fallen to less than 0.0001 per cent after leaving the catalyst chamber. Even when the temperature is raised above 400° C. the catalyst causes no decomposition of the gas mixture and it remains entirely free from carbon deposits. If the activity of the catalyst decreases after having been in use for a long time, it may be regenerated by passing air over the catalyst at a temperature of 300° to 400° C.

Example 2

A gas which has been prepared from brown coal and which contains about 0.5 per cent of acetylene as well as about 26 per cent of olefines and 24 per cent of hydrogen is led at 300° C. over a catalyst prepared from 14 parts of tungstic acid, 8 parts of zinc oxide and 4 parts of magnesium oxide by calcining and reducing with hydrogen. The gas is free from acetylene after leaving the catalyst chamber.

In the above described procedure there occurs no decomposition of the components of the gas other than acetylene and no impairing of the catalyst by deposition of soot or other matter even if the temperature is raised up to 600° C. If, however, the tungsten or molybdenum is replaced by aluminium oxide or iron oxide part of the .ydrocarbons is decomposed at the temperature of 400° C. necessary for an effective removal of the acetylene and after a short time the passage is clogged up by the formation of soot.

What I claim is:—

1. A process for the removal of acetylene hydrocarbons from a gas containing these as an impurity and hydrogen, which comprises passing said gas at an elevated temperature over a catalyst comprising at least one of the metals molybdenum and tungsten.

2. A process for the removal of acetylene hydrocarbons from a gas containing these as an impurity and hydrogen, which comprises passing said gas at a temperature between 200° and 600° C. over a catalyst comprising at least one of the metals molybdenum and tungsten.

3. A process for the removal of acetylene hydrocarbons from a gas containing these as an impurity and hydrogen, which comprises passing said gas at a temperature ranging between 200° and 400° C. over a catalyst comprising at least one of the metals molybdenum and tungsten.

4. A process for the removal of acetylene hydrocarbons from a gas containing these as an impurity and hydrogen, which comprises passing said gas at a temperature between 200° and 600° C. over a catalyst comprising at least one of the metals molybdenum and tungsten in combination with a difficultly reducible oxide.

5. A process for the removal of acetylene hydrocarbons from a gas containing these as an impurity and hydrogen, which comprises passing said gas at a temperature between 200° and 400° C. over a catalyst comprising at least one of the metals molybdenum and tungsten in combination with a material selected from the group consisting of aluminium oxide, zinc oxide and chromium oxide.

6. A process for the removal of acetylene hydrocarbons from a gas containing these as an impurity and hydrogen, which comprises passing said gas at a temperature between 200° and 600° C. over a catalyst comprising at least one of the metals molybdenum and tungsten deposited on a carrier.

7. A process for the removal of acetylene hydrocarbons from a gas containing these as an impurity and hydrogen which comprises passing said gas at a temperature between 200° and 600° C. and at a pressure ranging between atmospheric pressure and 200 atmospheres over a catalyst comprising at least one of the metals molybdenum and tungsten.

8. A process for the removal of acetylene hydrocarbons from coke oven gas, which has been freed from tar and ammonia, which comprises passing said gas at a temperature of about 250° C. over a catalyst prepared from molybdic acid and chromic acid.

In testimony whereof I have hereunto set my hand.

KARL BRAUS.